(12) United States Patent
Kawahara et al.

(10) Patent No.: US 12,362,363 B2
(45) Date of Patent: Jul. 15, 2025

(54) ELECTRODE BINDER FOR A NONAQUEOUS SECONDARY BATTERY AND NONAQUEOUS SECONDARY BATTERY ELECTRODE

(71) Applicant: SHOWA DENKO K. K., Tokyo (JP)

(72) Inventors: Yuta Kawahara, Tatsuno (JP); Tomonori Kurata, Kawasaki (JP); Mitsuru Hanasaki, Himeji (JP)

(73) Assignee: Resonac Corporation, Tokyo (JP)

( * ) Notice: Subject to any disclaimer, the term of this patent is extended or adjusted under 35 U.S.C. 154(b) by 311 days.

(21) Appl. No.: 17/777,509

(22) PCT Filed: Oct. 22, 2020

(86) PCT No.: PCT/JP2020/039678
§ 371 (c)(1),
(2) Date: May 17, 2022

(87) PCT Pub. No.: WO2021/131279
PCT Pub. Date: Jul. 1, 2021

(65) Prior Publication Data
US 2023/0357469 A1    Nov. 9, 2023

(30) Foreign Application Priority Data

Dec. 24, 2019    (JP) ................................ 2019-233083

(51) Int. Cl.
| | | |
|---|---|---|
| *H01M 4/62* | (2006.01) | |
| *C08F 220/06* | (2006.01) | |
| *C08L 33/02* | (2006.01) | |
| *H01M 4/04* | (2006.01) | |
| *H01M 4/13* | (2010.01) | |
| *H01M 4/139* | (2010.01) | |
| *H01M 10/0569* | (2010.01) | |

(52) U.S. Cl.
CPC ........... *H01M 4/622* (2013.01); *C08F 220/06* (2013.01); *C08L 33/02* (2013.01); *H01M 4/0404* (2013.01); *H01M 4/139* (2013.01); *H01M 10/0569* (2013.01); *H01M 4/13* (2013.01); *H01M 2300/0034* (2013.01); *H01M 2300/004* (2013.01)

(58) Field of Classification Search
None
See application file for complete search history.

(56) References Cited

U.S. PATENT DOCUMENTS

| | | | |
|---|---|---|---|
| 2013/0108776 A1* | 5/2013 | Li | H01M 4/139 |
| | | | 427/126.6 |
| 2018/0013131 A1* | 1/2018 | Yamamoto | H01M 4/622 |
| 2019/0058195 A1 | 2/2019 | Hanasaki et al. | |

FOREIGN PATENT DOCUMENTS

| | | | | |
|---|---|---|---|---|
| CN | 105504169 A | | 4/2016 | |
| CN | 105940530 A | | 9/2016 | |
| CN | 107011817 A | | 8/2017 | |
| CN | 108475788 A | * | 8/2018 | ............ C08F 220/06 |
| CN | 110100337 A | | 8/2019 | |
| EP | 2 908 364 A1 | | 8/2015 | |
| JP | 11-219708 A | | 8/1999 | |
| JP | 2002-117860 A | | 4/2002 | |
| JP | 2009170287 A | * | 7/2009 | |
| JP | 2013-149396 A | | 8/2013 | |
| JP | 2015023015 A | | 2/2015 | |
| WO | 2017/150200 A1 | | 9/2017 | |

OTHER PUBLICATIONS

Machine Translation of JP 2009170287A (Year: 2009).*
Machine Translation of CN 108475788A (Year: 2018).*
Y. Kitazaki, et al., "Extension of Fowkes' Equation and Estimation of Surface Tension of Polymer Solids", Journal of the Adhesion Society of Japan, 1972, pp. 131-141, vol. 8, No. 3.
International Search Report for PCT/JP2020/039678 dated Dec. 1, 2020 [PCT/ISA/210].
European Search Report for application No. 20866911.9 dated Dec. 3, 2021.
Office Action for Chinese application No. 202080005272.4 dated Aug. 4, 2021.
Notice of Allowance for Korean application No. 10-2021-7008377 dated Jul. 28, 2021.
Office Action for Chinese application No. 202080005272.4 dated Apr. 6, 2022.

* cited by examiner

*Primary Examiner* — Gregg Cantelmo
(74) *Attorney, Agent, or Firm* — Sughrue Mion, PLLC

(57) ABSTRACT

An electrode binder for a nonaqueous secondary battery; and a nonaqueous secondary battery electrode. The electrode binder for a nonaqueous secondary battery contains a resin component and is water-soluble. The surface free energy $\gamma_B$ at 23° C. is 70 mJ/m² or less, and the dipole component $\gamma^P_B$ of the surface free energy is 26 mJ/m² or less.

11 Claims, 8 Drawing Sheets

ELECTRODE BINDER FOR A NONAQUEOUS SECONDARY BATTERY AND NONAQUEOUS SECONDARY BATTERY ELECTRODE

CROSS REFERENCE TO RELATED APPLICATIONS

This application is a National Stage of International Application No. PCT/JP2020/039678 filed Oct. 22, 2020, claiming priority based on Japanese Patent Application No. 2019-233083 filed Dec. 24, 2019, the contents of which are incorporate herein by reference.

TECHNICAL FIELD

The invention provides an electrode binder for a nonaqueous secondary battery and a nonaqueous secondary battery electrode.

BACKGROUND TECHNOLOGY

A secondary battery (nonaqueous secondary battery) using a nonaqueous electrolyte is superior to a secondary battery using an aqueous electrolyte in terms of high voltage, miniaturization, and weight reduction. For this reason, the nonaqueous secondary battery is widely used as a power source for notebook PC, a mobile phone, a power tool, and an electronic and communication equipment. In recent years, the nonaqueous secondary battery has also been used for an electric vehicle and a hybrid vehicle from the viewpoint of environmental vehicle application, but there is a strong demand for higher output, higher capacity, and longer life. A lithium ion secondary battery is a typical example of the nonaqueous secondary battery.

The nonaqueous secondary battery comprises a positive electrode using a metal oxide or the like as an active material, a negative electrode using a carbon material or the like such as graphite as an active material, and a nonaqueous electrolyte solvent containing mainly carbonates or flame-retardant ionic liquids. The nonaqueous secondary battery is a secondary battery in which the battery is charged and discharged by the movement of ions between a positive electrode and a negative electrode. Specifically, the positive electrode is obtained by applying a slurry containing a metal oxide and a binder on a surface of a positive electrode current collector such as an aluminum foil, drying the current collector having the slurry, and cutting the current collector into an appropriate size. The negative electrode is obtained by applying a slurry containing a carbon material and a binder on the surface of a negative electrode current collector such as a copper foil, drying the current collector having the slurry, and cutting the current collector into an appropriate size. The binder serves to bond the active material to each other and bond the active material to the current collector in the positive electrode and the negative electrode, thereby preventing the active material from being separated from the current collector.

As a binder, a polyvinylidene fluoride (PVDF) binder using an organic solvent N-methyl-2-pyrrolidone (NMP) as a solvent is well known. However, the binder has low binding properties between the active materials and between the active material and the current collector, and a large amount of binder is required for actual use. Therefore, there is a disadvantage that the capacity of the nonaqueous secondary battery is reduced. Further, since NMP, which is an expensive organic solvent, is used for the binder, it is unlikely to reduce the manufacturing cost.

Patent Document 1 discloses a composite ink for forming a secondary battery electrode containing carboxymethyl cellulose, a water-dispersible binder and water.

Patent Document 2 discloses a binder for a nonaqueous secondary battery electrode containing a sodium acrylate-N-vinylacetamide copolymer (copolymerization ratio: sodium acrylate/N-vinylacetamide=10/90 by mass).

[Patent Document 1] Japanese Patent Application Laid-Open No. 2015-023015
[Patent Document 2] International Publication WO 2017/150200
[Non-Patent Document 1] KITAZAKI Yasuaki, HATA Toshio, Journal of the Japan Society for Adhesion, vol. 8, 131-141(1972).

SUMMARY OF THE INVENTION

Problem to be Solved by the Invention

The water-dispersible binder disclosed in Patent Document 1 requires use of carboxymethyl cellulose as a thickener in combination, and the slurry preparation process is complicated. In addition, regarding the binder, since the bondding properties between active materials and between active material and a current collector are insufficient, when an electrode is produced with a small amount of binder, a part of the active material is peeled off in the process of cutting the current collector.

The sodium acrylate-N-vinylacetamide copolymer disclosed in Patent Document 1 has a problem that cracks are generated frequently in an electrode having a large film thickness, that is, a large weight per area.

It is an object of the present invention to provide an electrode binder for a nonaqueous secondary battery, which can obtain a secondary battery having an electrode active material layer having a few cracks and a high peeling strength with respect to a current collector, and which has a low internal resistance and a good cycle characteristic; and a nonaqueous secondary battery electrode.

In order to solve the above problems, the present invention is as follows [1] to [12].

[1] An electrode binder for a nonaqueous secondary battery, which is water-soluble and comprises a resin component,
wherein a surface free energy $\gamma_B$ at 23° C. is 70 mJ/m$^2$ or less, and
a dipole component $\gamma^P_B$ of the surface free energy is 26 mJ/m$^2$ or less.

[2] The electrode binder for a nonaqueous secondary battery according to [1], wherein the surface free energy $\gamma_B$ is 66 mJ/m$^2$ or less.

[3] The electrode binder for a nonaqueous secondary battery according to [1] or [2], wherein the dipole component $\gamma_B$ of the surface free energy is 22 mJ/m$^2$ or less.

[4] The electrode binder for a nonaqueous secondary battery according to any one of [1] to [3], wherein a hydrogen bonding component $\gamma^h_B$ of the surface free energy is 24 mJ/m$^2$ or less.

[5] The electrode binder for a nonaqueous secondary battery according to any one of [1] to [4], wherein the resin component comprises a polymer of a compound having an ethylenically unsaturated bond.

[6] A nonaqueous secondary battery electrode, comprising a current collector and an electrode active material layer,
wherein the electrode active material layer comprises an electrode binder for a nonaqueous secondary battery according to any one of [1] to [5], and an electrode active material; and
the electrode active material layer is formed on the current collector.
[7] The nonaqueous secondary battery electrode according to [6],
wherein the electrode active material layer comprises 85% by mass or more and 99% by mass or less of the electrode active material.
[8] The nonaqueous secondary battery electrode according to [6] or [7], wherein the electrode active material comprises a Si element-containing material and a carbon material.
[9] The nonaqueous secondary battery electrode according to any one of [6] to [8], wherein a peeling strength of the electrode active material layer with respect to the current collector is 30 mN/mm or more.
[10] A nonaqueous secondary battery, which comprises the nonaqueous secondary battery electrode according to any one of [6] to [9],
wherein the nonaqueous secondary battery uses an alkali metal ion as a charge carrier.
[11] The nonaqueous secondary battery according to [10], comprising
an organic solvent solution of an alkali metal salt, as an electrolyte solution.
[12] The nonaqueous secondary battery according to [11], wherein the organic solvent of the electrolyte solution comprises at least one kind selected from the group consisting of a carbonate compound, a nitrile compound and a carboxylic acid ester.

Effect of the Invention

According to the present invention, it is possible to provide an electrode binder for a nonaqueous secondary battery, which can obtain a secondary battery having an electrode active material layer having a few cracks and a high peeling strength with respect to a current collector, and which has a low internal resistance and a good cycle characteristic; and a nonaqueous secondary battery electrode.

DESCRIPTION OF EMBODIMENTS

Figure 1:
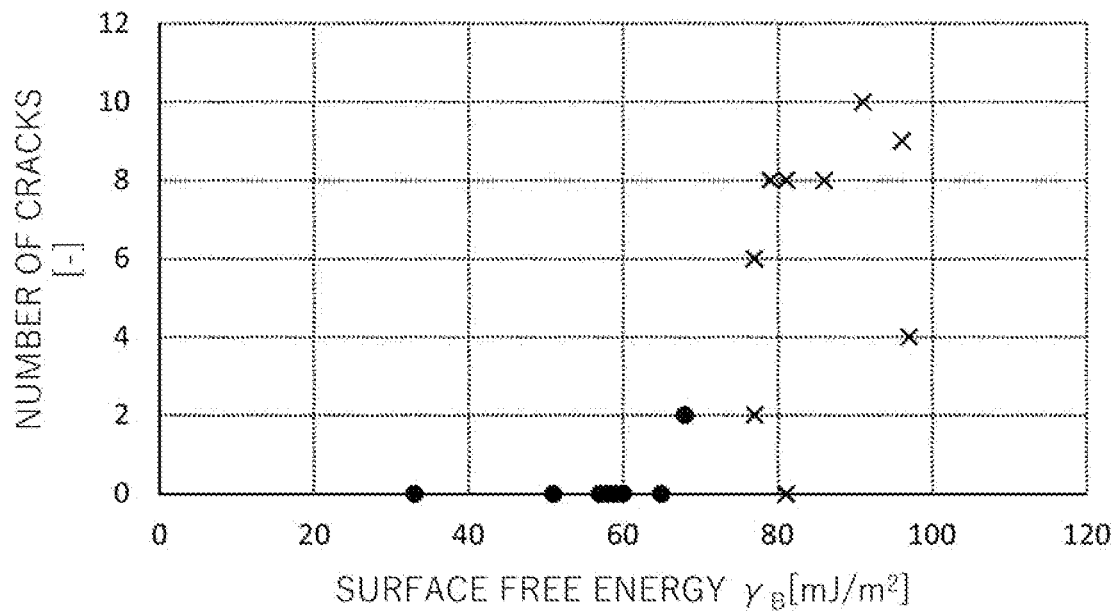
FIG. 1 is a plot of the number of cracks in the electrode active material layer with respect to the surface free energy $\gamma_B$ of the electrode binder (B) according to the examples and the comparative examples of the present invention.

Hereinafter, embodiments of the present invention will be described in detail. In the present embodiment, the nonaqueous secondary battery is a secondary battery accompanied by the transfer of ions serving as charge carriers between the positive electrode and the negative electrode in charge/discharge. The positive electrode includes a positive electrode active material, and the negative electrode includes a negative electrode active material. These electrode active materials are materials capable of ion intercalation and ion deintercalation. A preferred example of a secondary battery having such a configuration is a lithium-ion secondary battery.

In the following description, "surface" means "hyomen" unless otherwise specified.

"(Meth)acrylic acid" means one or both of methacrylic acid and acrylic acid. "(Meth)acrylate" refers to one or both of methacrylate and acrylate. "(Meth)acrylonitrile" refers to one or both of methacrylonitrile and acrylonitrile.

"Non-volatile component", which is contained in a mixture (for example, a slurry, or a composition) means a component which has a boiling point of 130° C. or higher at 1 atmosphere (1013 hPa). "Non-volatile component concentration" of a mixture means the percentage (% by mass) of the components contained in the mixture which have a boiling point of 130° C. or higher at 1 atm (1013 hPa).

In the present invention, the surface free energy, its dispersion force component, its dipole component, and its hydrogen bonding component are values at 23° C. unless otherwise specified.

<1. Nonaqueous Secondary Battery Electrode>

A nonaqueous secondary battery electrode (hereinafter sometimes referred to as "electrode") according to the present embodiment includes a current collector and an electrode active material layer formed on the current collector. The shape of the electrode may be, for example, a laminate or a wound body, but is not particularly limited.

[1-1. Current Collectors]

The current collector is preferably a sheet-like metal having a thickness of 0.001 to 0.5 mm, and the metal includes iron, copper, aluminum, nickel, stainless steel, and the like. When the nonaqueous secondary battery electrode is a negative electrode of a lithium ion secondary battery, the current collector is preferably a copper foil.

[1-2. Electrode Active Material Layer]

The electrode active material layer of the present embodiment includes an electrode active material (A) and an electrode binder (B). In addition to these components, the electrode active material layer may contain a conductive auxiliary agent or the like. A peeling strength of the electrode active material layer with respect to the current collector is preferably 30 mN/mm or more, more preferably 40 mN/mm or more, and still more preferably 50 mN/mm or more. This is because it is possible to suppress the separation of the electrode active material layer from the current collector due to the manufacturing process such as the electrode manufacturing process, the battery assembly process; and an external force applied to the battery.

[1-2-1. Electrode Active Material (A)]

The electrode active material (A) is a material capable of intercalating and deintercalating an ion serving as a charge carrier. For example, if the charge carrier is a lithium ion, the nonaqueous secondary battery becomes a lithium ion secondary battery. A content of the electrode active material (A) in the electrode active material layer is preferably 85% by mass or more, more preferably 90% by mass or more, and still more preferably 92% by mass or more. This is because it is possible to increase a capacity of intercalating and deintercalating the charge carrier into and from the electrode and to increase the charge/discharge capacity of the nonaqueous secondary battery.

A content of the electrode active material (A) in the electrode active material layer is preferably 99% by mass or less, more preferably 98% by mass or less, and still more preferably 97% by mass or less. This is because the electrode binder (B) is included in the electrode active material layer (The effect will be described later.).

"1-2-1-1. Negative Electrode Active Material"

When the nonaqueous secondary battery electrode is a negative electrode of the lithium ion secondary battery, examples of the negative electrode active material include a carbon material, a lithium titanate, a silicon, a silicon compound, and the like. Examples of the carbon material include coke such as petroleum coke, pitch coke, and coal coke; carbonized organic compound; graphite such as artificial graphite and natural graphite. Examples of the silicon compound include SiOx ($0.1 \leq x \leq 2.0$). As the negative electrode active material, a material by combining two or more of the materials mentioned above may be used.

The negative electrode active material preferably includes a Si element-containing material or a carbon material. This is because a charge-discharge capacity is increased while a good cycle characteristics of the nonaqueous secondary battery is maintained. It is more preferable to use a composite material of SiOx and a carbon material, or a composite material of silicon and a carbon material (Si/Graphite) as the negative electrode active material. The carbon material further preferably includes graphite. This is because an effect of improving binding property of the negative electrode active material by the electrode binder (B) is high. In the composite material, a covalent bond, a hydrogen bond, or the like may be formed between two or more kinds of the materials, but the bond may not be formed. As a specific example of the artificial graphite, SCMG (registered trademark)-XRs (manufactured by Showa Denko K.K.) can be cited.

"1-2-1-2. Positive Electrode Active Material"

When the nonaqueous secondary battery electrode is a positive electrode of a lithium ion secondary battery, examples of the positive electrode active material include a lithium cobaltate ($LiCoO_2$), a lithium complex oxide containing nickel, a spinel type lithium manganate ($LiMn_2O_4$), a olivine type lithium iron phosphate, a chalcogen compound such as $TiS_2$, $MnO_2$, $MoO_3$, $V_2O_5$ or the like. The positive electrode active material may contain either one of these compounds alone or a plurality of compounds. Other alkali metal oxides may also be used. Examples of the lithium complex oxide containing nickel include a Ni—Co—Mn lithium complex oxide, a Ni—Mn—Al lithium complex oxide, a Ni—Co—Al lithium complex oxide and the like. Specific examples of the positive electrode active material include $LiNi_{1/3}Mn_{1/3}Co_{1/3}O_2$ or $LiNi_{3/5}Mn_{1/5}Co_{1/5}$.

[1-2-2 Electrode Binder (B)]

The electrode binder (B) according to the present embodiment is a water-soluble binder containing a resin component. The electrode binder (B) according to the present embodiment is used for bonding the electrode active materials (A) to each other and bonding the electrode active material (A) to the current collector. In the electrode active material layer, a content of the electrode binder (B) is preferably 1.0% by mass or more, and more preferably 3.0% by mass or more. This is because it is possible to suppress slipping down of an electrode active material (A) and to improve peeling strength of the electrode active material layer. In the electrode active material layer, the content of the electrode binder (B) is preferably 12.0% by mass or less, and more preferably 7.0% by mass or less. This is because it is possible to increase the charge/discharge capacity of a battery by including more electrode active material (A) in the electrode active material layer.

"1-2-2-1 Surface Free Energy of Electrode Binder (B)"

The surface free energy $\gamma_B$ of the electrode binder (B) at 23° C. is 70 mJ/m$^2$ or less, preferably 66 mJ/m$^2$ or less, more preferably 55 mJ/m$^2$ or less, and still more preferably 40 mJ/m$^2$ or less. This is because a DCR of the battery can be lowered.

The surface free energy $\gamma$ is sum of a dispersion force component $\gamma^d$, a dipole component $\gamma^P$, and a hydrogen bond component $\gamma^h$. That is, $\gamma = \gamma^d + \gamma^P + \gamma^h$. A value of a dipole component $\gamma^P_B$ in the surface free energy $\gamma_B$ of the electrode binder (B) is 26 mJ/m$^2$ or less. This is because DCR of the battery can be lowered and the discharge capacity retention rate of the battery can be enhanced. The value of the dipole component $\gamma^P_B$ is preferably 22 mJ/m$^2$ or less, more preferably 19 mJ/m$^2$ or less, and still more preferably 10 mJ/m$^2$ or less. This is because a DCR of the battery can be further reduced.

In the surface free energy $\gamma_B$ of the electrode binder (B), a value of a hydrogen bonding component $\gamma^h_B$ is preferably 24 mJ/m$^2$ or less, and more preferably 20 mJ/m$^2$ or less. This is because a peeling strength of the electrode active material layer to the current collector becomes higher.

It is effective to adjust the surface free energy $\gamma_B$ of the electrode binder (B) and the values of the components $\gamma^d_B$, $\gamma^P_B$, $\gamma^h_B$ by using, for example, a surfactant. A detailed description of the surfactant will be described later.

In the present invention, the surface free energy $\gamma_B$ of the electrode binder (B); and the dispersion force component $\gamma^d_B$, the dipole component $\gamma^P_B$, and the hydrogen bond component $\gamma^h_B$ of the surface free energy $\gamma_B$ are values obtained by the Kitasaki-Hata theory described in Non-Patent Document 1, and are obtained in detail by the method described below.

"1-2-2-2 Method for Determining Surface Free Energy"

A method for determining the surface free energy of the electrode binder (B) will be described. According to the Kitasaki-Hata theory, the following equation holds between a contact angle $\theta$ between a solid S and a liquid L; and a surface free energy of the solid S and a surface free energy of the liquid L.

[Equation 1]

$$\sqrt{\gamma^d_s \gamma^d_L} + \sqrt{\gamma^P_s \gamma^P_L} + \sqrt{\gamma^h_s \gamma^h_L} = \gamma_L(1+\cos\theta)/2 \quad (1)$$

$\gamma_S$ represents the surface free energy of the solid S, $\gamma^d_S$ represents its dispersion force component, $\gamma^P_S$ represents its dipole component, and $\gamma^h_S$ represents its hydrogen bonding component. $\gamma_L$ represents the surface free energy of liquid L, $\gamma^d_L$ represents its dispersive component, $\gamma^P_L$ represents its dipole component, and $\gamma^h_L$ represents its hydrogen bonding component.

The components $\gamma^d_S$, $\gamma^P_S$, and $\gamma^h_S$ of the surface free energy of the solid S can be obtained, respectively, by measuring contact angles between the solid S and three kinds of liquids L1, L2 and L3 whose surface free energies are known in advance and solving the following simultaneous equations of three elements.

The following equation holds between the solid S and the liquid L1.

[Equation 2]

$$\sqrt{\gamma^d_s \gamma^d_{L1}} + \sqrt{\gamma^P_s \gamma^P_{L1}} + \sqrt{\gamma^h_s \gamma^h_{L1}} = \gamma_{L1}(1+\cos\theta_1)/2 \quad (2)$$

$\gamma_{L1}$ represents the surface free energy of liquid L1, $\gamma^d_{L1}$ represents its dispersion force component, $\gamma^P_{L1}$ represents its dipole component, and $\gamma^h_{L1}$ represents its hydrogen bonding component. $\theta_1$ represents a contact angle between the solid S and the liquid L1. Then, $\gamma_{L1}$, $\gamma^d_{L1}$, $\gamma^P_{L1}$, $\gamma^h_{L1}$ and $\theta_1$ are respectively set to predetermined values.

The following equation holds between the solid S and the liquid L2.

[Equation 3]

$$\sqrt{\gamma^d_s \gamma^d_{L2}} + \sqrt{\gamma^P_s \gamma^P_{L2}} + \sqrt{\gamma^h_s \gamma^h_{L2}} = \gamma_{L2}(1+\cos\theta_2)/2 \quad (3)$$

$\gamma_{L2}$ represents the surface free energy of the liquid L2, $\gamma^d_{L2}$ represents its dispersion force component, $\gamma^P_{L2}$ represents its dipole component, and $\gamma^h_{L2}$ represents its hydrogen bonding component. $\theta_2$ represents a contact angle between the solid S and the liquid L2. Then, $\gamma_{L2}$, $\gamma^d_{L2}$, $\gamma^P_{L2}$, $\gamma^h_{L2}$ and $\theta_2$ are respectively set to predetermined values.

The following equation holds between the solid S and the liquid L3.

[Equation 4]

$$\sqrt{\gamma^d_s \gamma^d_{L3}} + \sqrt{\gamma^P_s \gamma^P_{L3}} + \sqrt{\gamma^h_s \gamma^h_{L3}} = \gamma_{L3}(1+\cos\theta_3)/2 \quad (4)$$

$\gamma_{L3}$ represents the surface free energy of liquid L3, $\gamma^d_{L3}$ represents its dispersion force component, $\gamma^P_{L3}$ represents its dipole component, and $\gamma^h_{L3}$ represents its hydrogen bonding component. $\theta_3$ represents a contact angle between the solid S and the liquid L3. Then, $\gamma_{L3}$, $\gamma^d_{L3}$, $\gamma^P_{L3}$, $\gamma^h_{L3}$ and $\theta_3$ are respectively set to predetermined values.

In the present invention, the surface free energy is a value calculated based on a contact angle obtained by a measurement method described later using diiodomethane ($\gamma_{L1}$:50.8 mJ/m$^2$, $\gamma^d_{L1}$:46.8 mJ/m$^2$, $\gamma^P_{L1}$:4.0 mJ/m$^2$, $\gamma^h_{L1}$:0.0 mJ/m$^2$) as the liquid L1, ethylene glycol ($\gamma_{L2}$:47.7 mJ/m$^2$, $\gamma^d_{L2}$:30.1 mJ/m$^2$, $\gamma^P_{L2}$:0.0 mJ/m$^2$, $\gamma^h_{L2}$:17.6 mJ/m$^2$) as the liquid L2, and distilled water ($\gamma_{L3}$:72.8 mJ/m$^2$, $\gamma^d_{L3}$:29.1 mJ/m$^2$, $\gamma^P_{L3}$:1.3 mJ/m$^2$, $\gamma^h_{L3}$:42.4 mJ/m$^2$).

In the above equations, by using the solid S as the electrode binder (B), the surface free energy of the electrode binder and each component thereof can be obtained. That is, $\gamma_S = \gamma_B$, $\gamma^d_S = \gamma^d_B$, $\gamma^P_S = \gamma^P_B$, $\gamma^h_S = \gamma^h_B$.

"1-2-2-3. Method for Measuring Contact Angle"

The contact angle is measured according to steps (i) to (iii) below.

(i) 1 mL of a 10% by mass aqueous solution of the electrode binder (B) is added dropwise onto a glass plate, and the aqueous solution added dropwise is spread thinly by using a 2 mil applicator.

(ii) The glass plate coated with the electrode binder (B) aqueous solution is dried in a blower dryer set at 60° C. for 5 minutes to form a film.

(iii) The film is allowed to stand in a 23° C. and 50% Rh atmosphere for 2 minutes, and then the contact angle is measured, in accordance with JIS R 3257, by using a sessile drop method using a contact angle meter "CA-VP Type" manufactured by Kyowa Interfacial Science Co., Ltd.

Contact angles $\theta_1$, $\theta_2$, and $\theta_3$ are measured for diiodomethane (Liquid L1), ethylene glycol (Liquid L2), and distilled water (Liquid L3), respectively, which are used as droplets in the sessile drop method. The measured values are substituted into the Equations (2), (3), and (4), respectively, to obtain the surface free energies $\gamma_B$ and each component of $\gamma^d_B$, $\gamma^P_B$, and $\gamma^h_B$, as described above.

"1-2-2-4. Component Contained in the Electrode Binder (B)"

The electrode binder (B) is a water-soluble binder containing a resin component. The electrode binder (B) preferably contains 95% by mass or more of a water-soluble organic compound. The electrode binder (B) may be composed of one kind of compound or may contain two or more kinds of compounds. In the electrode, all of the water-soluble compounds contained in the electrode active material layer are components of the electrode binder (B). When the electrode is incorporated in the nonaqueous secondary battery, the component dissolved in the solvent of the electrolytic solution is not included in the components constituting the electrode binder (B).

The resin component includes a polymer of a compound having an ethylenically unsaturated bond. The polymer of the compound having an ethylenically unsaturated bond may be a polymer of one kind of compound or a copolymer of two or more kinds of compounds. Examples of the compound having the ethylenically unsaturated bond include a (meth)acrylic acid and its derivative, a (meth)acrylic acid salt, and another vinyl compound. Examples of the (meth) acrylic acid derivative include a (meth)acrylic acid ester, a (meth)acrylamide, and a (meth)acrylonitrile. Examples of the (meth)acrylic acid salt include an alkali metal salt of (meth)acrylic acid such as a sodium (meth)acrylate, and an ammonium (meth)acrylate. Examples of the other vinyl compound include a styrene, a divinylbenzene, a butadiene, an N-vinylacetamide, an N-vinylformamide, a vinyl alcohol, a vinyl acetate and the like.

The resin component may include a resin having a function as a dispersant. Here, the dispersant can improve dispersibility of insoluble components such as an electrode active material (A) and a conductive auxiliary agent in an electrode slurry to be described later, and can disperse the insoluble components better in the electrode active material layer produced by using the electrode slurry. A cellulose derivative is preferably used as the resin having the function as a dispersant. This is because, in addition to the above effect as a dispersant, the peeling strength of the electrode active material layer with respect to the current collector can be improved.

Examples of the cellulose derivative include a carboxymethyl cellulose, a methyl cellulose and a hydroxypropyl cellulose; and their metal salts. The cellulose derivative may contain any one of these compounds alone or may contain multiple kinds of these compounds. Another cellulose derivative can also be used. The cellulose derivative is preferably a carboxymethyl cellulose or its metal salt.

Further, the cellulose derivative can greatly reduce the surface free energy $\gamma_B$ of the electrode binder (B), its dipole component $\gamma^p_B$, and its hydrogen bonding component $\gamma^h_B$, when the cellulose derivative is used in an appropriate amount. From this viewpoint, a content of the cellulose derivative in the electrode binder (B) is preferably 8% by mass or more, more preferably 12% by mass or more, and still more preferably 16% by mass or more. From the same viewpoint, the content of the cellulose derivative in the electrode binder (B) is preferably 80% by mass or less, more preferably 60% by mass or less, and still more preferably 50% by mass or less.

The glass transition temperature Tg of the resin component contained in the electrode binder (B) is more preferably 100° C. or higher, and more preferably 130° C. or higher. The glass transition point Tg is a peak top temperature of a DDSC chart which is a derivative of a DSC curve obtained by using EXSTAR DSC/SS 7020 manufactured by Hitachi High-Tech Science Co., Ltd. As the sample, a 2 mm×2 mm×0.5 mm film obtained by drying an aqueous solution of the resin component was used, and the measurement is carried out while raising the temperature at 10° C./minute.

The electrode binder (B) may contain, in addition to the resin component, a surfactant; and a polymerization initiator and a catalyst used for synthesis of the resin component, or the like. The surfactant is preferably used for effectively adjusting the surface free energy $\gamma_B$ of the electrode binder (B) and the values of its components $\gamma^d_B$, $\gamma^p_B$ and $\gamma^h_B$.

The content of the surfactant in the electrode binder (B) is preferably 2.5% by mass or more, more preferably 8.0% by mass or more, and still more preferably 20% by mass or more. This is because the surface free energy $\gamma_B$ of the electrode binder (B), its dipole component $\gamma^p_B$, and its hydrogen bonding component $\gamma^h_B$ can be reduced.

The content of the surfactant in the electrode binder (B) is preferably 75% by mass or less, more preferably 50% by mass or less, still more preferably 40% by mass or less, and particularly preferably 15% by mass or less. This is because the peeling strength of the electrode active material layer to the current collector and the cycle characteristic of the electrode can be maintained at a high level.

When the surfactant is used, any one of an anionic surfactant, a cationic surfactant, an amphoteric surfactant, and a nonionic surfactant may be used, but the nonionic surfactant is preferred. This is because the dipole component $\gamma^p_B$ and its hydrogen bonding component $\gamma^h_B$ can be efficiently reduced. However, since the peeling strength of the electrode active material layer tends to decrease when the content of the nonionic surfactant is excessive, it is preferable to adjust the content of the surfactant in the electrode active material layer in consideration of this point.

Examples of the nonionic surfactant include a polyoxyethylene alkyl ether, a sorbitan fatty acid ester, a glycerol fatty acid ester, a polyoxyethylene sorbitan fatty acid ester, a polyoxyethylene sorbitol fatty acid ester, a polyoxyethylene fatty acid ester, a polyoxyethylene hydrogenated castor oil, a polyoxyethylene alkylamine and the like. The nonionic surfactant may contain any one of these compounds alone or may contain multiple kinds of the compounds. Other nonionic surfactants may also be used.

The nonionic surfactant is preferably a compound having a segment composed of an ethylene oxide structure, and more preferably a polyoxyethylene alkyl ether.

[1-2-3 Other Components]

The electrode active material layer may contain, in addition to the above components, a carbon black, a vapor growth carbon fiber, or the like as a conductive auxiliary agent. As a specific example of the vapor growth carbon fiber, VGCF (registered trademark)-H (Showa Denko K.K.) or the like may be used.

<2. Method of Manufacturing Nonaqueous Secondary Battery Electrode>

Hereinafter, an example of a method of manufacturing a nonaqueous secondary battery electrode will be described, but the method is not limited to the method described herein if an electrode having the above configurations can be obtained. In one example, the electrode can be manufactured by coating an electrode slurry on a current collector, drying it to obtain an electrode sheet, and then cutting the electrode sheet into an appropriate size and shape as necessary. The electrode slurry includes the electrode active material (A) and the electrode binder (B). The detailed configuration of the electrode slurry will be described later.

Examples of the method for applying the electrode slurry on the current collector include a reverse roll method, a direct roll method, a doctor blade method, a knife method, an extrusion method, a curtain method, a gravure method, a bar method, a dip method and a squeeze method. Among them, the doctor blade method, the knife method or the extrusion method are preferable, and it is more preferable to applying the electrode slurry by using the doctor blade method. This is because the applying method is suitable for various physical properties of the electrode slurry such as viscosity and is suitable for drying, and because a coating film having a good surface condition can be obtained.

The electrode slurry may be applied to only one side of the current collector, or may be applied to both sides. When the electrode slurry is applied to both sides of the current collector, it may be applied on one side at a time, or both sides may be applied simultaneously. The electrode slurry may be continuously applied to the surface of the current collector or intermittently applied. The amount and range of applying the electrode slurry can be appropriately determined in accordance with the size of the battery etc. The weight per area of the electrode active material layer after drying is preferably 4 to 20 mg/cm$^2$, more preferably 6 to 16 mg/cm$^2$.

The method of drying the applied electrode slurry is not particularly limited, but for example, hot air, vacuum, (far) infrared radiation, electron beam, microwave, and cold air can be used alone or in combination. The drying temperature is preferably from 40° C. to 180° C., and the drying time is preferably from 1 minute to 30 minutes.

The electrode sheet having the electrode active material layer formed on the current collector may be cut to a suitable size and shape as an electrode. The cutting method of the electrode sheet is not particularly limited, but slits, lasers, wire cuts, cutters, Thomson, and the like can be used.

The electrode sheet may be pressed, as necessary, before or after cutting. Thus, the electrode active material is firmly bound by the current collector, and the battery can be made compact by thinning the electrode. As the pressing method, a general method can be used, and in particular, a die pressing method or a roll pressing method is preferably used. The press pressure is not particularly limited, but is preferably 0.5 to 5 t/cm$^2$. This is because it is possible to suppress influence on intercalation and deintercalation of a charge carrier such as a lithium ion into and from the electrode active material (A).

<3. Electrode Slurry>

The electrode slurry of the present embodiment includes an electrode active material (A), an electrode binder (B), and an aqueous medium. The electrode slurry may optionally include a conductive auxiliary agent, etc.

In the electrode slurry, the electrode binder (B) is preferably dissolved in an aqueous medium. This is because the electrode binder (B) easily forms a uniform layer on surface of particles of the electrode active material (A) after drying the slurry. The aqueous medium contained in the electrode slurry is water, a hydrophilic solvent, or a mixture thereof.

The non-volatile component concentration of the electrode slurry is preferably 20% by mass or more, more preferably 30% by mass or more, and still more preferably 40% by mass or more. This is because it is possible to form more electrode active material layers with a small amount of the electrode slurry. The non-volatile component concentration in the electrode slurry is preferably 80% by mass or less, more preferably 70% by mass or less, and still more preferably 60% by mass or less. This is because the electrode slurry can be easily prepared.

A content of the electrode active material (A) and a content of the electrode binder (B) in the non-volatile component of the electrode slurry are the same as the content of the electrode active material (A) and the content of the electrode binder (B) in the electrode active material layer, respectively, as described above in the description of the nonaqueous secondary battery electrode.

<4. Method of Manufacturing Electrode Slurry>

An example of a method of manufacturing an electrode slurry is a method of mixing the electrode active material (A), the electrode binder (B), and other components added as necessary, by adding them to an aqueous medium. In this case, an order in which the components are added may be appropriately adjusted so that the components are easily dissolved or dispersed in the aqueous medium; or after mixing two or more components in the solid phase, these mixtures may be added to the aqueous medium. A mixing method in each step is not particularly limited, but for example, a method of mixing necessary components using a mixing device such as a stirring type, a rotating type, or a shaking type may be used. The addition order of the components to be mixed is not particularly limited.

Another example of a method for producing an electrode slurry is a method of mixing a binder solution in which the electrode binder (B) is dissolved in an aqueous medium, the electrode active material (A), and other components as necessary. An example of the mixing method is the same as the above example.

<5. Nonaqueous Secondary Battery>

The nonaqueous secondary battery according to the present embodiment preferably uses an alkali metal ion as a charge carrier, and more preferably uses a lithium ion as a charge carrier. Hereinafter, as a preferable example of the nonaqueous secondary battery according to the present embodiment, a lithium ion secondary battery in which a charge carrier is a lithium ion will be described, but the configuration of the battery is not limited to that described herein. In the lithium ion secondary battery according to the example described here, a positive electrode, a negative electrode, an electrolytic solution, and parts such as separators as necessary are housed in an outer package, and a nonaqueous secondary battery electrode manufactured by the above method is used for one or both of the positive electrode and the negative electrode.

[5-1. Electrolyte Solution]

A nonaqueous liquid having ionic conductivity is used as an electrolyte solution. Examples of the electrolyte solution include a solution in which an electrolyte is dissolved in an organic solvent, an ionic liquid, and the like, but the former is preferable. As the electrolyte solution, a solution in which an alkali metal salt described below is dissolved in an organic solvent (also called "organic solvent solution of alkali metal salt") is more preferable. This is because a nonaqueous secondary battery having a low manufacturing cost and a low internal resistance can be obtained.

The electrolyte is preferably an alkali metal salt, and can be appropriately selected according to the kind of the electrode active material or the like. Examples of the electrolyte include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, a lithium aliphatic carboxylate and the like. Another alkali metal salt may also be used as the electrolyte.

Examples of the organic solvent for dissolving the electrolyte include, but are not limited to, a carbonate compound such as an ethylene carbonate (EC), a propylene carbonate (PC), a diethyl carbonate (DEC), a methylethyl carbonate (MEC), a dimethyl carbonate (DMC), a fluoroethylene carbonate (FEC), a vinylene carbonate (VC); a nitrile compounds such as acetonitrile; and a carboxylic acid ester such as a ethyl acetate, a propyl acetate, a methyl propionate, an ethyl propionate, and a propyl propionate.

Among these compounds, it is preferable to use an organic solvent comprising one or more kinds selected from the group consisting of the carbonate compounds, the nitrile compounds and the carboxylic acid esters. These organic solvents may be used alone or in combination of two or more.

[5-2. Outer Package]

For example, a laminate material of an aluminum foil and a resin film can be suitably used as an outer package, but the present invention is not limited thereto. The shape of the battery may be any one of a coin type, a button type, a seat type, a cylindrical type, a square type, a flat type, and the like.

EXAMPLE

In the following examples, as an example of the constitution of the present invention, electrode binders (B) of a lithium ion secondary battery, negative electrodes, and lithium ion secondary batteries were prepared, and the effect of the present invention is confirmed by comparing them with comparative examples. It should be noted that the present invention is not limited to the examples.

<1. Synthesis of Copolymer (P)>

Synthesis Examples 1 to 8

The methods for producing the copolymers (P1) to (P8) are the same. A separable flask equipped with a cooling tube, a thermometer, a stiffer and a dropping funnel was charged with 100 parts by mass of total of the corresponding monomers having the compositions shown in Table 1, 0.2 parts by mass of 2,2'-azobis-(2-methylpropionamidine)dihydrochloride, 0.05 parts by mass of ammonium persulfate and 693 parts by mass of water at 30° C. The mixture was heated to 80° C. and polymerized for 4 hours. Thereafter, the mixture was cooled to room temperature, dried and ground to obtain powdery copolymers (P1) to (P8), respectively.

TABLE 1

|  |  | Synthesis Example | | | | | | | |
|---|---|---|---|---|---|---|---|---|---|
|  |  | 1 | 2 | 3 | 4 | 5 | 6 | 7 | 8 |
| Copolymer (P) |  | P1 | P2 | P3 | P4 | P5 | P6 | P7 | P8 |
| Monomer content [% by mass] | N-vinylacetamide | 10 | 1.0 | 15 | 10 | 100 |  |  |  |
|  | Sodium acrylate | 90 | 99 | 85 | 75 |  | 100 |  |  |
|  | Acrylic acid |  |  |  | 15 |  |  | 100 |  |
|  | Polyvinyl alcohol |  |  |  |  |  |  |  | 100 |

<2. Preparation of Negative Electrode Slurry>

In any one of Examples and Comparative Examples, each component was mixed at the ratio shown in Table 2 to prepare a negative electrode slurry. As the mixing method, 37.65 parts by mass of SCMG (registered trademark)-XRs (manufactured by Showa Denko K.K.) as a negative electrode active material, 9.60 parts by mass of silicon monoxide (SiO) (manufactured by Sigma-Aldrich), 2.25 parts by mass of total amount of each component contained in the electrode binder (B) (as shown in Tables 3 and 4), 0.50 parts by mass of VGCF (registered trademark)-H (Showa Denko K.K.), and 23.5 parts by mass of water were added, and the mixture was thickly kneaded using a stirring type mixer (a rotary revolution stirring mixer) at 2000 rotations per minute for 4 minutes. Further, 26.5 parts by mass of water was added and further mixed at 2000 rpm for 4 minutes, and then a negative electrode slurry was prepared.

TABLE 2

| Slurry for electrode | | % mass |
|---|---|---|
| Electrode active material (A) | Graphite (SCMG (registered trademark)-XRs manufactured by Showa Denko K.K.) | 37.65 |
|  | Silicon monoxide (manufactured by Sigma-Aldrich) | 9.60 |
| Electrode binder (B) | One of (B1) to (B18), the details are shown in Table 3 and Table 4. | 2.25 |
| Conductive auxiliary agent | Fibrous carbon (VGCF (registered trademark)-H manufactured by Showa Denko K.K.) | 0.50 |
| Aqueous medium | Ion-exchanged water | 50.0 |
|  | Total | 100 |

TABLE 3

|  |  |  |  | Example | | | | | | | | |
|---|---|---|---|---|---|---|---|---|---|---|---|---|
|  |  |  |  | 1 | 2 | 3 | 4 | 5 | 6 | 7 | 8 | 9 |
| Electrode Binder (B) |  |  |  | B1 | B2 | B3 | B4 | B5 | B6 | B7 | B8 | B9 |
| Resin component [part by mass] | Copolymer (P) | P1 |  | 100 |  |  |  |  | 100 | 100 | 100 | 100 | 100 |
|  |  | P2 |  |  | 100 |  |  |  |  |  |  |  |
|  |  | P3 |  |  |  | 100 |  |  |  |  |  |  |
|  |  | P4 |  |  |  |  | 100 |  |  |  |  |  |
|  |  | P5 |  |  |  |  |  |  |  |  |  |  |
|  |  | P6 |  |  |  |  |  |  |  |  |  |  |
|  |  | P7 |  |  |  |  |  |  |  |  |  |  |
|  |  | P8 |  |  |  |  |  |  |  |  |  |  |
|  | Carboxymethyl cellulose | CMC DAICEL 1110 (*1) | | 33.3 | 33.3 | 33.3 | 33.3 | 33.3 | 33.3 | 333 |  | 33.3 |
|  |  | CMC DAICEL 1190 (*2) | |  |  |  |  |  |  |  | 33.3 |  |
| Surfactant [part by mass] | Polyoxyethylene alkyl ether | Eg 1108 (*3) |  | 16.7 | 16.7 | 16.7 | 16.7 | 50.0 | 333 |  | 16.7 | 16.7 |
|  |  | Eg 1118S-70 (*4) |  |  |  |  |  |  |  |  |  | 16.7 |
|  | Polyoxyethylene alkyl ether sulfate (*5) | | | | | | | | | | | |
|  | Quaternary ammonium salts or dimethylaminopropylamide stearate (*6) | | | | | | | | | | | |

TABLE 3-continued

| | | Example | | | | | | | | |
|---|---|---|---|---|---|---|---|---|---|---|
| | | 1 | 2 | 3 | 4 | 5 | 6 | 7 | 8 | 9 |
| Surface free energy of electrode binder (B) [mJ/m$^2$] | Dispersion force component $\gamma^d_B$ | 28 | 25 | 24 | 24 | 21 | 15 | 30 | 27 | 28 |
| | Dipole component $\gamma^p_B$ | 15 | 21 | 18 | 19 | 15 | 6 | 20 | 15 | 16 |
| | Hydrogen-bonding component $\gamma^h_B$ | 14 | 19 | 16 | 17 | 15 | 12 | 18 | 15 | 15 |
| | $\gamma_B$ | 57 | 65 | 58 | 60 | 51 | 33 | 68 | 57 | 59 |
| Electrode evaluation | Number of cracks | 0 | 0 | 0 | 0 | 0 | 0 | 2 | 0 | 0 |
| | Peel strength [mN/mm] | 59 | 56 | 61 | 60 | 57 | 50 | 70 | 55 | 58 |
| Battery evaluation | Discharge capacity retention Rate[%] | 91 | 93 | 89 | 87 | 90 | 88 | 90 | 87 | 90 |
| | DCR [Ω] | 15 | 16 | 14 | 15 | 13 | 11 | 19 | 15 | 15 |

TABLE 4

| | | | Comparative Example | | | | | | | | |
|---|---|---|---|---|---|---|---|---|---|---|---|
| | | | 1 | 2 | 3 | 4 | 5 | 6 | 7 | 8 | 9 |
| Electrode Binder (B) | | | B10 | B11 | B12 | B13 | B14 | B15 | B16 | B17 | B18 |
| Resin component (P) [part by mass] | Copolymer (P) | P1 | | | | | 100 | 100 | 100 | 100 | 100 |
| | | P2 | | | | | | | | | |
| | | P3 | | | | | | | | | |
| | | P4 | | | | | | | | | |
| | | P5 | 100 | | | | | | | | |
| | | P6 | | 100 | | | | | | | |
| | | P7 | | | 100 | | | | | | |
| | | P8 | | | | 100 | | | | | |
| | Carboxymethyl-cellulose | CMC DAICEL 1110 (*1) | | | | | | 33.3 | 33.3 | 33.3 | |
| | | CMC DAICEL1190 (*2) | | | | | | | | | |
| Surfactant [part by mass] | Polyoxyethylene alkyl ether | Eg 1108 (*3) | | | | | | | | 16.7 | |
| | | Eg 1118S-70 (*4) | | | | | | | | | |
| | Polyoxyethylene alkyl ether sulfate (*5) | | | | | | | 16.7 | | | |
| | Quaternary ammonium salts or dimethylaminopropylamide stearate (*6) | | | | | | | | | 16.7 | |
| Surface free energy of electrode binder (B) [mJ/m$^2$] | Dispersive force component $\gamma^d_B$ | | 19 | 23 | 22 | 23 | 24 | 23 | 29 | 25 | 22 |
| | Dipole component $\gamma^p_B$ | | 50 | 40 | 52 | 41 | 32 | 30 | 34 | 30 | 30 |
| | Hydrogen-bonding component $\gamma^h_B$ | | 28 | 18 | 17 | 13 | 30 | 26 | 33 | 26 | 25 |
| | $\gamma_B$ | | 97 | 81 | 91 | 77 | 86 | 79 | 96 | 81 | 77 |
| Electrode evaluation | Number of cracks | | 4 | 8 | 10 | 2 | 8 | 8 | 9 | 0 | 6 |
| | Peel strength [mN/mm] | | 60 | 60 | 61 | 50 | 63 | 10 | 3 | 45 | 60 |
| Battery evaluation | Discharge capacity retention Rate[%] | | 85 | 84 | 86 | 88 | 86 | — | — | 80 | 85 |
| | DCR [Ω] | | 27 | 27 | 28 | 29 | 29 | 40 | 40 | 22 | 27 |

In Tables 3 and 4
*1: CMC DAICEL 1110: manufactured by Daicel Co., Ltd., etherification degree: 0.7; 2% viscosity: 100 to 200 (mPa·s)
*2: CMC DAICEL 1190: manufactured by Daicel Co., Ltd., etherification degree: 0.7; 1% viscosity: 1300 to 2000 (mPa·s)
*3 and *4: both manufactured by Kao Corporation
*5: HITENOL (registered trademark) 08E: manufactured by Daiichi Kogyo Seiyaku Co., Ltd.
*6: Catiogen (registered trademark) TML: manufactured by Daiichi Kogyo Seiyaku Co., Ltd.

<3. Surface Free Energy of Electrode Binder (B)>

In each of Examples 1 to 9 and Comparative Examples 1 to 9, an aqueous solution containing 10% by mass of each electrode binder (B) having the composition shown in Tables 3 and 4 was prepared. Using the aqueous solution, a film of each electrode binder (B) was formed on a glass plate by the method described above in the description of the contact angle measurement method.

Using the film of each electrode binder (B) thus obtained, each contact angle was measured with respect to diiodomethane, ethylene glycol and water by the method described above. Using the measured contact angle values, a dispersion force component $\gamma^d_B$, a dipole component $\gamma^p_B$, and a hydrogen bonding component $\gamma^h_B$ were obtained by solving the ternary simultaneous equations consisting of the above equations (2) to (4). A surface free energy $\gamma_B$ ($=\gamma^d_B+\gamma^p_B+\gamma^h_B$) was obtained by summing up these components.

For the electrode binder (B) in each of the Examples and Comparative Examples, $\gamma^d_B$, $\gamma^p_B$, $\gamma^h_B$, and $\gamma_B$ are shown in Tables 3 and 4.

<4. Battery Fabrication>

[4-1. Preparation of Negative Electrode]

A negative electrode slurry prepared in each of Examples and Comparative Examples was applied to one side of a 10 μm thick copper foil (current collector) using a doctor blade so that the weight per area after drying was 8 mg/cm². The copper foil coated with the negative electrode slurry was dried at 60° C. for 10 minutes and then at 100° C. for 5 minutes to prepare a negative electrode sheet having a negative electrode active material layer formed thereon. The negative electrode sheet was pressed at a press pressure of 1 t/cm² using a die press. The pressed negative electrode sheet was cut out to 22 mm×22 mm, and a negative electrode was manufactured by attaching a conductive tab.

[4-2. Preparation of Positive Electrode]

A positive electrode slurry was prepared by mixing 90 parts by mass of $LiNi_{1/3}Mn_{1/3}Co_{1/3}O_2$, 5 parts by mass of an acetylene black, and 5 parts by mass of a polyvinylidene fluoride, and then mixing 100 parts by mass of N-methylpyrrolidone (The ratio of $LiNi_{1/3}Mn_{1/3}Co_{1/3}O_2$ in the solids was 0.90.).

The prepared positive electrode slurry was applied to one side of an aluminum foil (current collector) having 20 μm thickness using a doctor blade so that the weight per area after drying was 22.5 mg/cm². The aluminum foil coated with the positive electrode slurry was dried at 120° C. for 5 minutes and then pressed by a roll press to prepare a positive electrode sheet having a positive electrode active material layer having a thickness of 100 μm. The obtained positive electrode sheet was cut out to 20 mm×20 mm, and a positive electrode was manufactured by attaching a conductive tab.

[4-3. Preparation of Electrolyte Solution]

An ethylene carbonate (EC), an ethyl methyl carbonate (EMC) and a fluoroethylene carbonate (FEC) were mixed in a volume ratio of 30:60:10. $LiPF_6$ and a vinylene carbonate (VC) were dissolved in the resulting mixed solvent at a concentration of 1.0 mol/L and 1.0% by mass, respectively, to prepare an electrolyte solution.

[4-4. Battery Assembly]

The positive electrode and the negative electrode were arranged so that the positive electrode active material layer and the negative electrode active material layer faced each other via a separator made of a polyolefin porous film, and the positive electrode and the negative electrode were housed in a laminate outer package (battery pack) of an aluminum foil and a resin film. The lithium ion secondary battery was obtained by injecting the electrolyte solution into the outer package and packing it with a vacuum heat sealer.

<5. Evaluation>

Performances of each electrode and each battery, produced in each of Examples and Comparative Examples were evaluated. The evaluation methods are shown as follows and the results are shown in Tables 3 and 4.

[5-1. Number of Cracks in the Negative Electrode Active Material Layer]

An appearance was confirmed by visually observing the surface of the negative electrode sheet after the pressing process, and then the number of cracks in a rectangular area of 5 cm×20 cm was counted.

[5-2. Peeling Strength of Negative Electrode Active Material Layer]

Using the negative electrode sheet after the press process, a peeling strength of the negative electrode active material layer was measured in an atmosphere of 23° C. and 50% by mass relative humidity in all the processes. TENSILON (registered trademark, manufactured by A & D Co., Ltd.) was used as a testing machine. The negative electrode sheet was cut out with a width of 25 mm and a length of 70 mm, which was used as a test piece. The negative electrode active material layer on the test piece and a SUS plate having a width of 50 mm and a length of 200 mm were bonded together using a double-sided tape (NITTO TAPE (registered trademark) No 5, manufactured by Nitto Denko Corporation) so that the center of the test piece coincided with the center of the SUS plate. The double-sided tape was adhered to cover the entire range of the test piece.

After leaving the state, in which the test piece and the SUS plate were bonded together, for 10 minutes, the copper foil was peeled from one end of the negative electrode active material by 20 mm in the length direction, folded back by 180°, and the peeled part of the copper foil was grasped by the chuck on the upper side of the testing machine. Further, one end of the SUS plate from which the copper foil was removed was grasped by the chuck on the lower side. In this state, the copper foil was peeled from the test piece at a speed of 100±10 mm/min, and a graph of peeling length (mm)–peeling force (mN) was obtained. In the obtained graph, the average value of the peeling force at the peeling length of 10 to 45 mm (mN) was calculated, and the value obtained by dividing the average value of the peeling force by the width of the test piece of 25 mm was defined as the peeling strength of the negative electrode active material layer (mN/mm). In any one of the Examples and the Comparative Examples, separation between the double-sided tape and the SUS plate and interfacial separation between the double-sided tape and the negative electrode active material layer did not occur during the test.

[5-3. Battery Discharge Capacity Retention Rate (Cycle Characteristic)]

The charge-discharge cycle test of the battery was carried out under the condition of 25° C. according to the following procedure. First, the battery was charged until the voltage reached 4.2V with a current of 1 C (CC charge), and then it was charged until the current reached 1/20 C with a voltage of 4.2V (CV charging). After standing for 30 minutes, the battery was discharged until the voltage reached 2.75V with a current of 1 C (CC discharge). The sequence of operations of the CC charging, the CV charging, and the CC discharging was set to one cycle. The sum of the time integral values of the current in the n-th cycle of the CC charging and the CV charging is defined as an n-th cycle charging capacity (mAh), and the time integral value of the current in the n-th cycle CC discharging is defined as an n-th cycle discharging capacity (mAh). The discharge capacity retention rate of the n-th cycle of the battery is a ratio (%) of the discharge capacity of the n-th cycle to that of the first cycle. In the present examples and the comparative examples, the discharge capacity retention rate at the 100 cycle was evaluated.

[5-4. Internal Resistance (DCR)]

An internal resistance (DCR (Ω)) of the battery was measured under the condition of 25° C. by the following procedure. From the rest potential to 3.6V, a constant current of 0.2 C was charged, and the state of charge was set to 50% (SOC 50%) of the initial capacity. Thereafter, discharges were performed at the current values of 0.2 C, 0.5 C, 1 C, and 2 C for 60 seconds. From the relationship between these 4 current values (value per second) and voltages, DCR (Ω) at SOC 50% was determined.

<6. Evaluation Results>

The electrode binder (B) according to any one of the examples and the comparative examples contains at least a resin component. The electrode binder (B) according to any one of the examples and the comparative examples is also water-soluble. Hereinafter, the relationship between the surface free energy $\gamma_B$ and its components $\gamma^d_B$, $\gamma^p_B$ and $\gamma^h_B$ in the electrode binder (B); and the values obtained in each evaluation will be discussed.

[6-1. Appearance of Electrode (Number of Cracks)]

Figure 2:
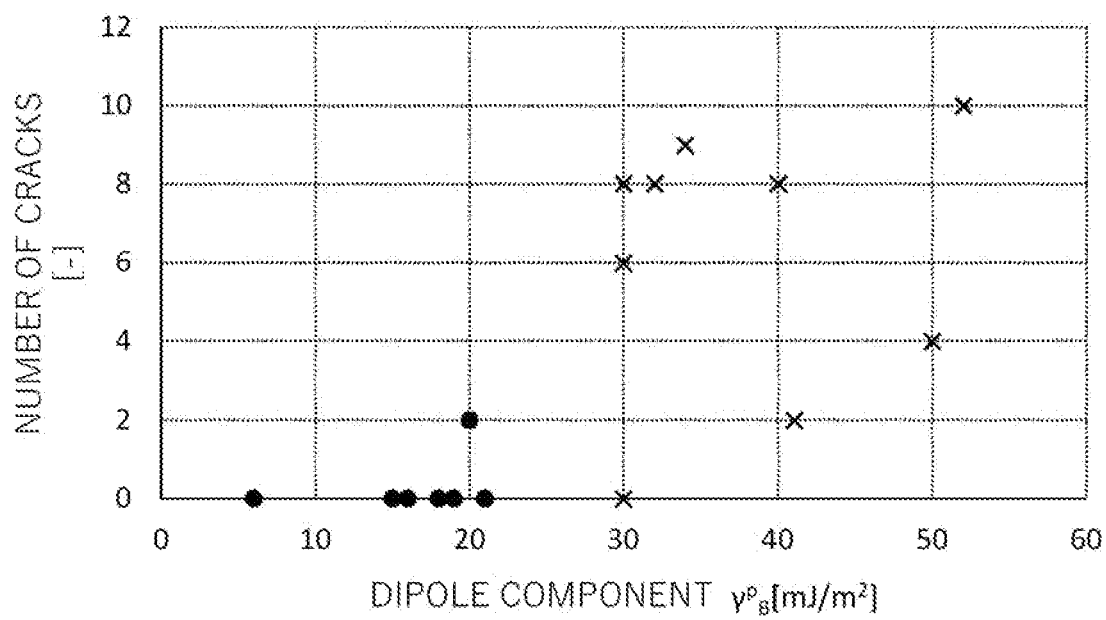
FIG. 2 is a plot of the number of cracks in the electrode active material layer with respect to the dipole component $\gamma^P_B$ of the surface free energy $\gamma_B$ of the electrode binder (B) according to the examples and the comparative examples of the present invention.
Figure 3:
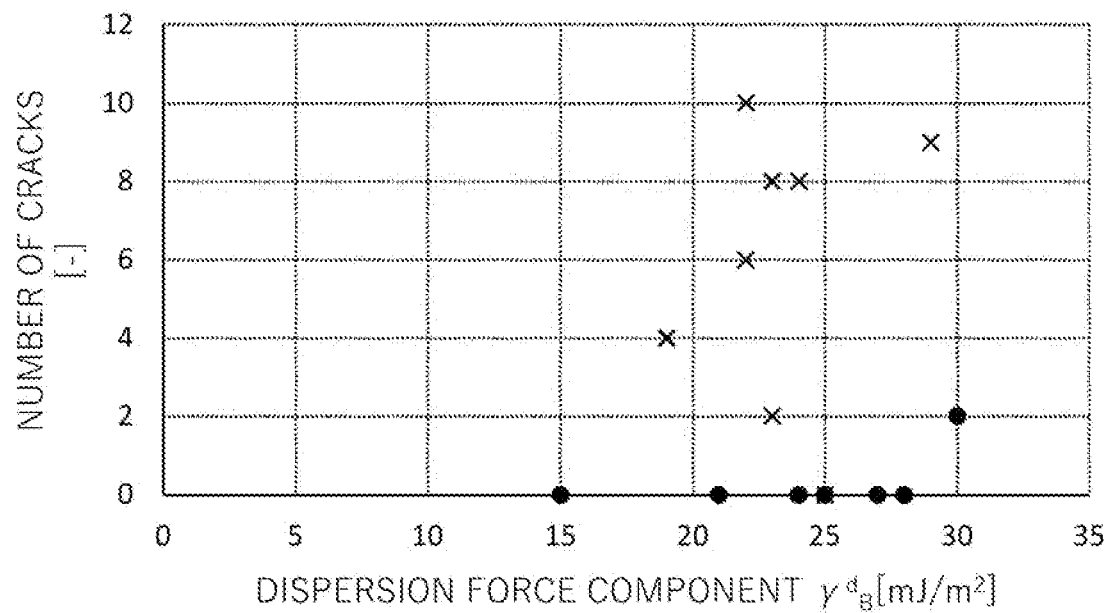
FIG. 3 is a plot of the number of cracks in the electrode active material layer with respect to the dispersion force component $\gamma^d_B$ of the surface free energy $\gamma_B$ of the electrode binder (B) according to the examples and the comparative examples of the present invention.
Figure 4:
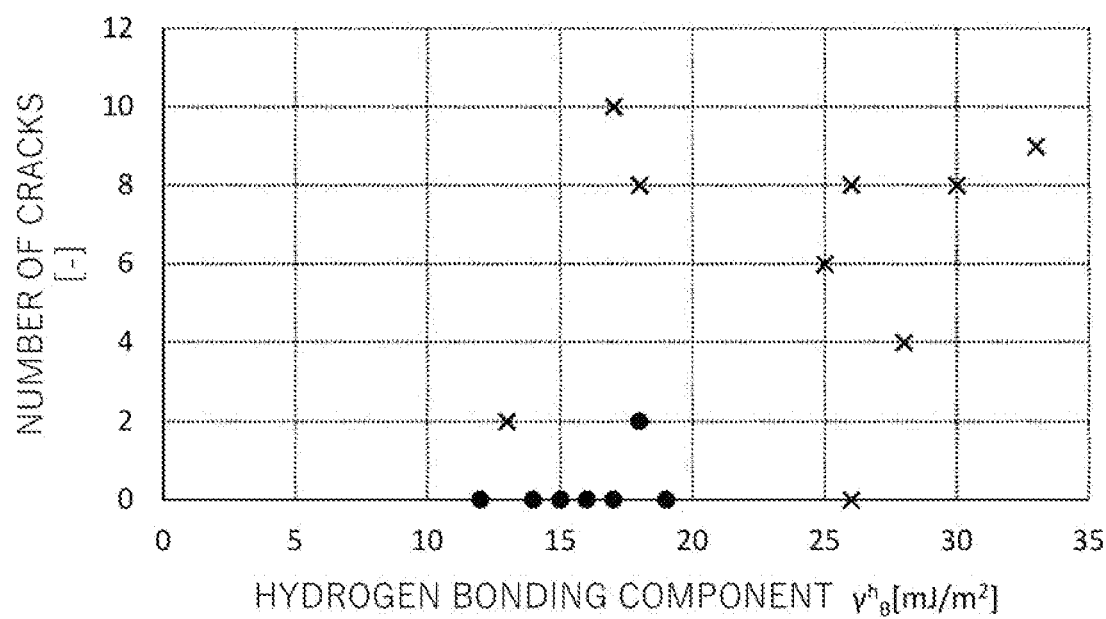
FIG. 4 is a plot of the number of cracks in the electrode active material layer with respect to the hydrogen bonding component $\gamma^h_B$ of the surface free energy $\gamma_B$ of the electrode binder (B) according to the examples and the comparative examples of the present invention.

FIGS. 1 to 4 are plots of a number of cracks in the electrode active material layer with respect to the surface free energy $\gamma_B$ of the electrode binder (B) and its components $\gamma^d_B$, $\gamma^p_B$ and $\gamma^h_B$ according to the examples and the comparative examples of the present invention. In the figures, an example is shown by • and a comparative example is shown by x.

As can be seen from FIGS. 1 to 4, when the surface free energy $\gamma_B$ of the electrode binder (B) is 70 mJ/m² or less and the dipole component $\gamma^p_B$ of the surface free energy is 26 mJ/m² or less, the generation of cracks in the electrode active material layer can be suppressed by the electrode binder (B).

[6-2. Peeling Strength of Electrode Active Material Layer]

Figure 5:
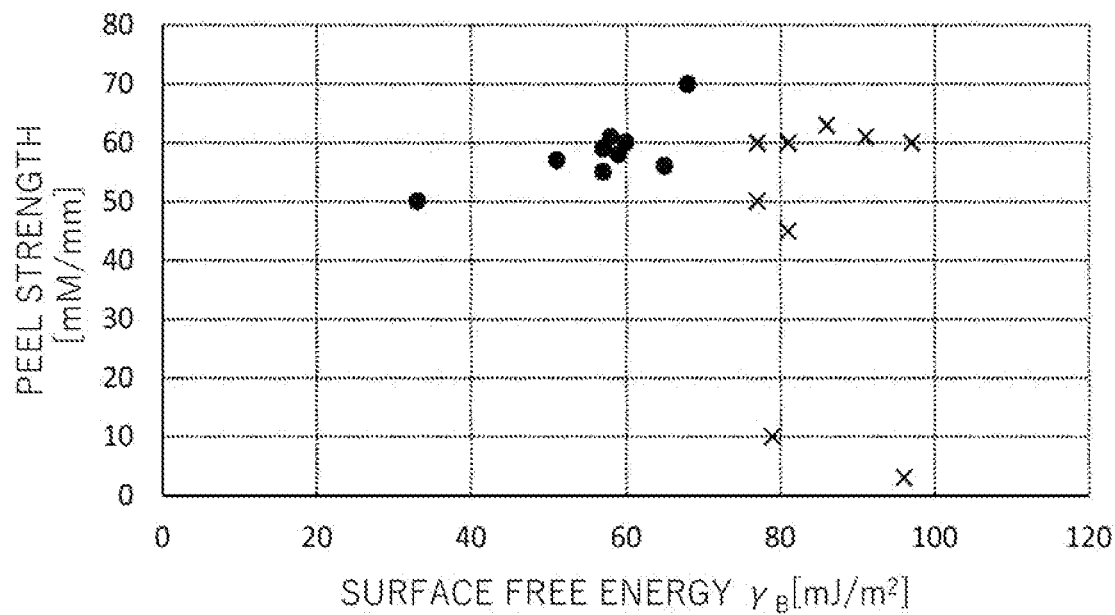
FIG. 5 is a plot of the peel strength of the electrode active material layer with respect to the surface free energy $\gamma_B$ of the electrode binder (B) according to the examples and the comparative examples of the present invention.
Figure 6:
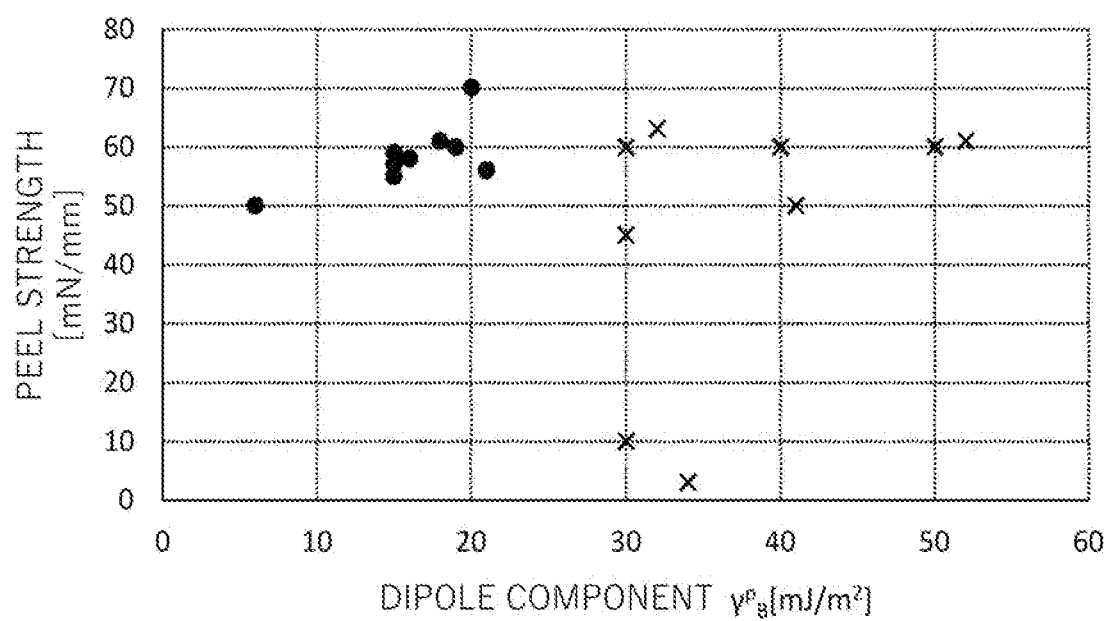
FIG. 6 is a plot of the peel strength of the electrode active material layer with respect to the dipole component $\gamma^P_B$ of the surface free energy $\gamma_B$ of the electrode binder (B) according to the examples and the comparative examples of the present invention.
Figure 7:
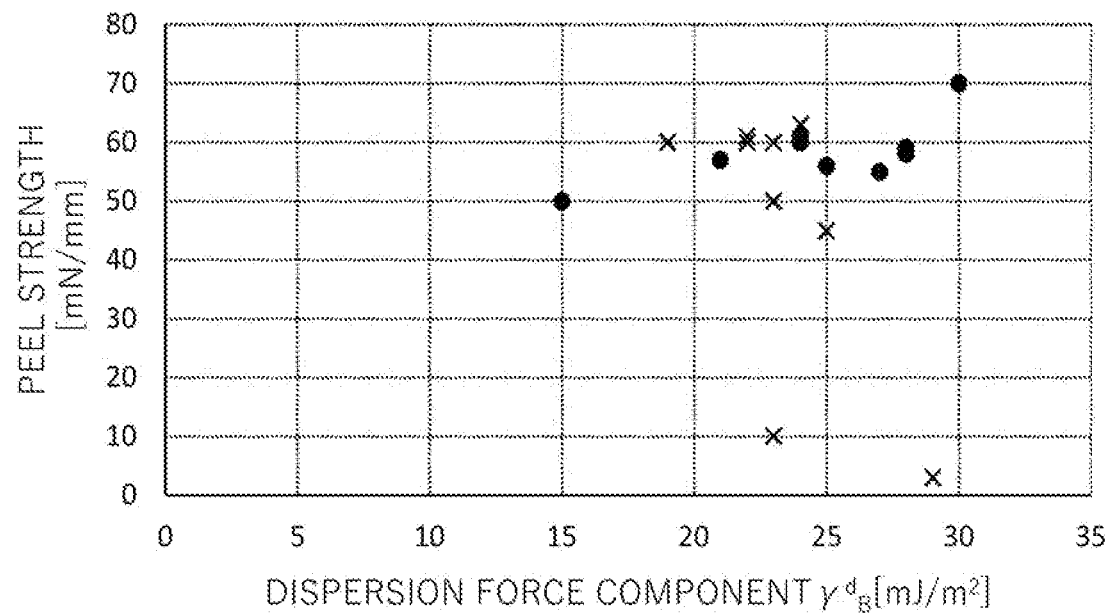
FIG. 7 is a plot of the peel strength of the electrode active material layer with respect to the dispersion force component $\gamma^d_B$ of the surface free energy $\gamma_B$ of the electrode binder (B) according to the examples and the comparative examples of the present invention.
Figure 8:
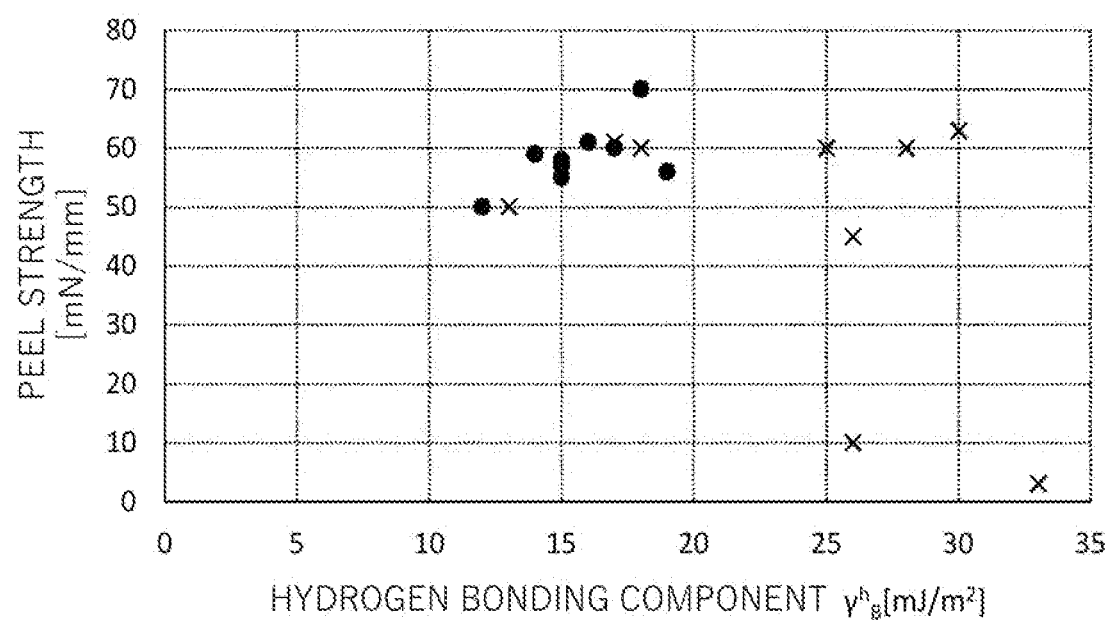
FIG. 8 is a plot of the peel strength of the electrode active material layer with respect to the hydrogen bonding component $\gamma^h_B$ of the surface free energy $\gamma_B$ of the electrode binder (B) according to the examples and the comparative examples of the present invention.

FIGS. 5 to 8 are plots of the values of the peeling strength of the electrode active material layer with respect to the surface free energy $\gamma_B$ of the electrode binder (B) and its components $\gamma^d_B$, $\gamma^p_B$ and $\gamma^h_B$ according to the examples and the comparative examples of the present invention. In the figures, an example is shown by • and a comparative example is shown by x.

As can be seen from FIGS. 5 to 8, when the surface free energy $\gamma_B$ of the electrode binder (B) is 70 mJ/m² or less and the dipole component $\gamma^p_B$ of the surface free energy is 26 mJ/m² or less, the electrode active material layer with a high peeling strength can be formed by the electrode binder (B).

[6-3. Discharge Capacity Retention Rate]

Figure 9:
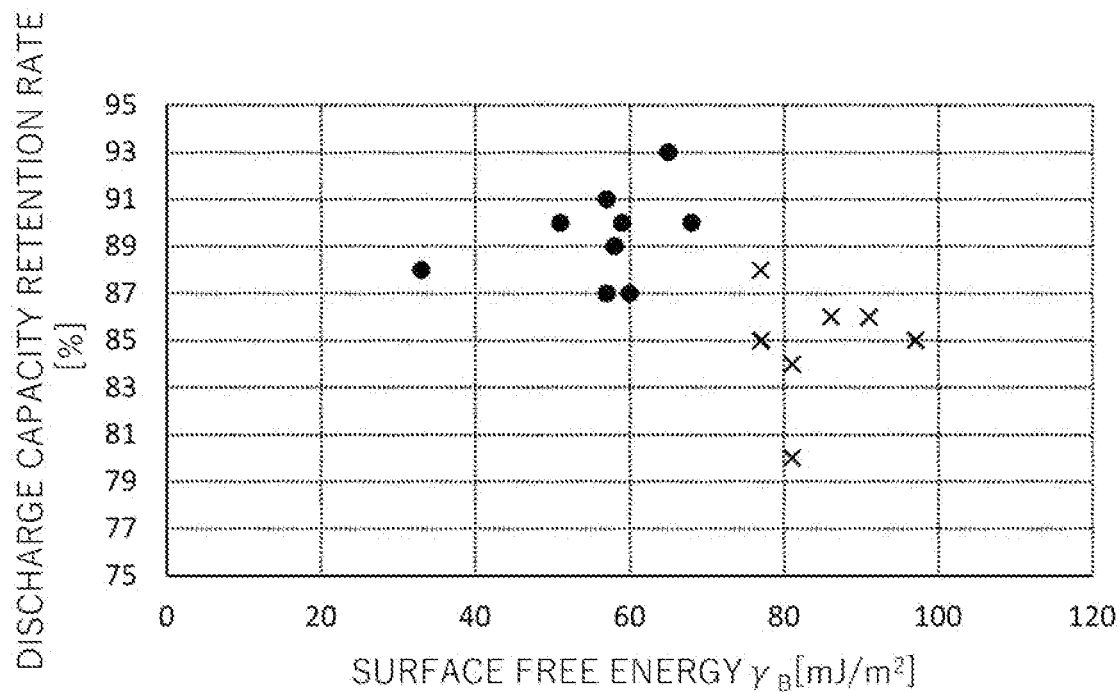
FIG. 9 is a plot of the value of the discharge capacity retention rate of the battery with respect to the surface free energy $\gamma_B$ of the electrode binder (B) according to the examples and the comparative examples of the present invention.
Figure 10:
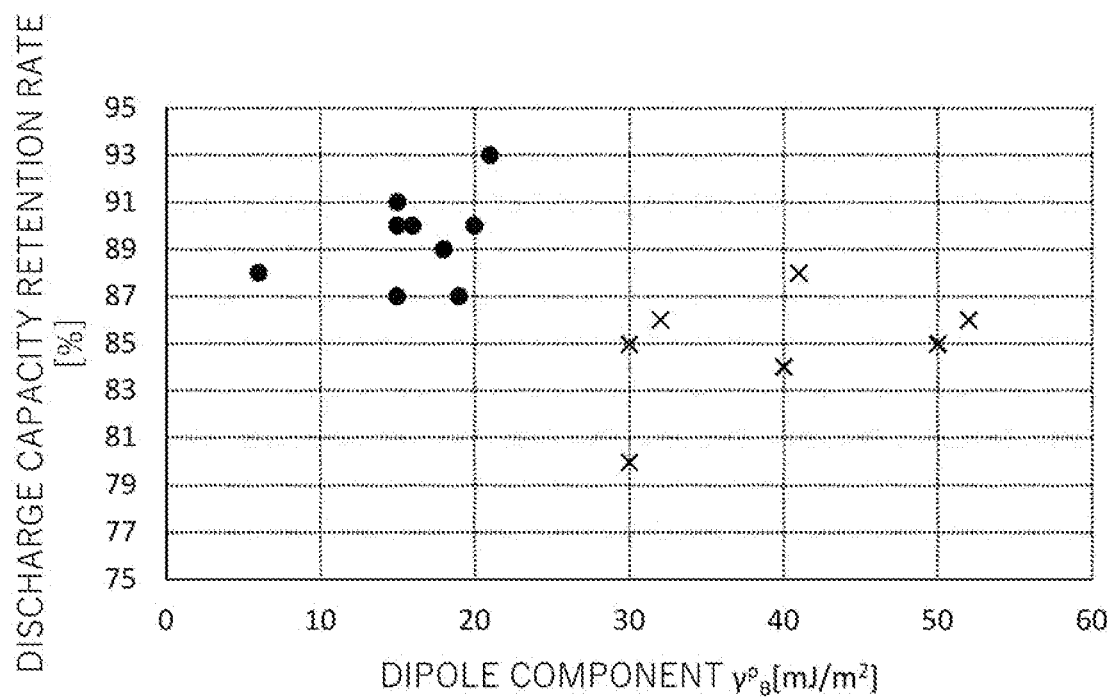
FIG. 10 is a plot of the value of the discharge capacity retention rate of the battery with respect to the dipole component $\gamma^P_B$ of the surface free energy $\gamma_B$ of the electrode binder (B) according to the examples and the comparative examples of the present invention.
Figure 11:
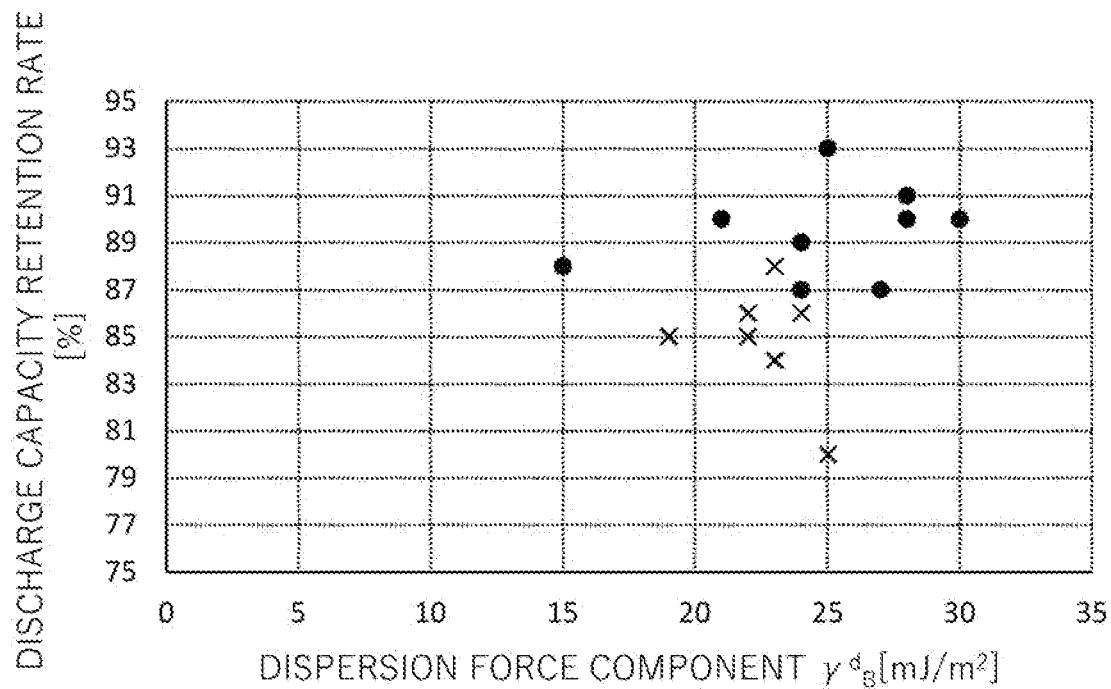
FIG. 11 is a plot of the value of the discharge capacity retention rate of the battery with respect to the dispersion force component $\gamma^d_B$ of the surface free energy $\gamma_B$ of the electrode binder (B) according to the examples and the comparative examples of the present invention.
Figure 12:
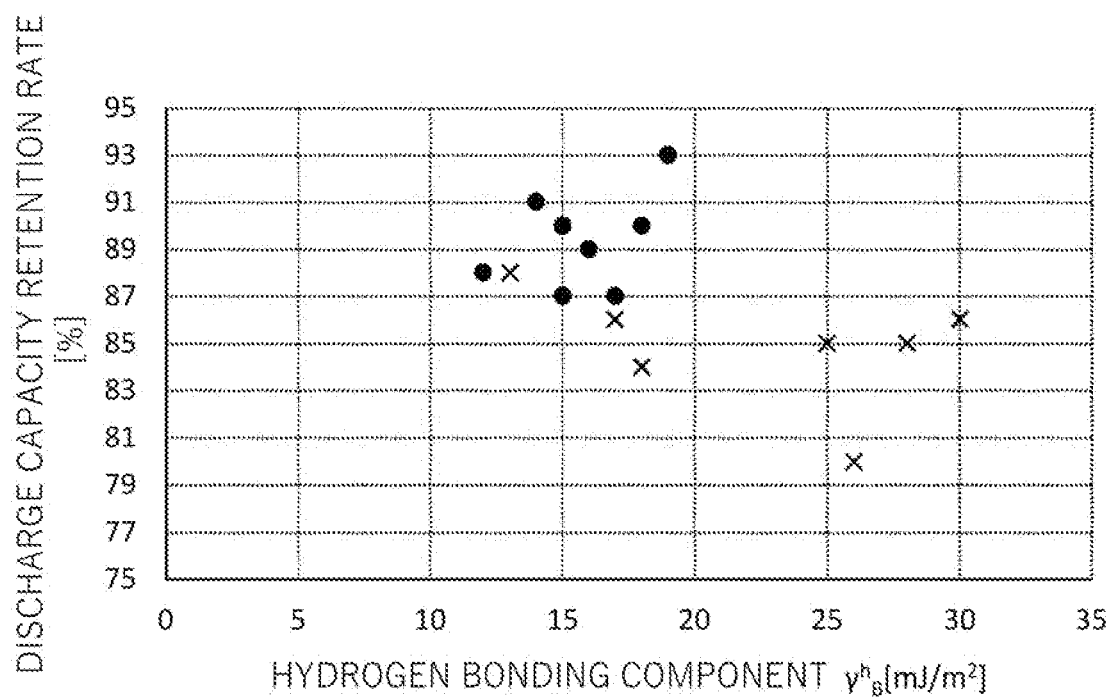
FIG. 12 is a plot of the value of the discharge capacity retention rate of the battery with respect to the hydrogen bonding component $\gamma^h_B$ of the surface free energy $\gamma_B$ of the electrode binder (B) according to the examples and the comparative examples of the present invention.

FIGS. 9 to 12 are plots of the values of the discharge capacity retention rate of the battery with respect to the surface free energy $\gamma_B$ of the electrode binder (B) and its components $\gamma^d_B$, $\gamma^p_B$, $\gamma^h_B$ according to the examples and the comparative examples of the present invention. In the figures, an example is shown by • and a comparative example is shown by x. In Comparative Examples 6 and 7, since it was impossible to measure the discharge capacity retention rates, plots corresponding to these Comparative Examples are not shown in FIGS. 9 to 12.

As can be seen from FIGS. 9 to 12, when the surface free energy $\gamma_B$ of the electrode binder (B) is 70 mJ/m² or less and the dipole component $\gamma^p_B$ of the surface free energy is 26 mJ/m² or less, the electrode binder (B) provides a battery having a high discharge capacity retention rate.

[6-4. Internal Resistance of the Battery (DCR)]

Figure 13:
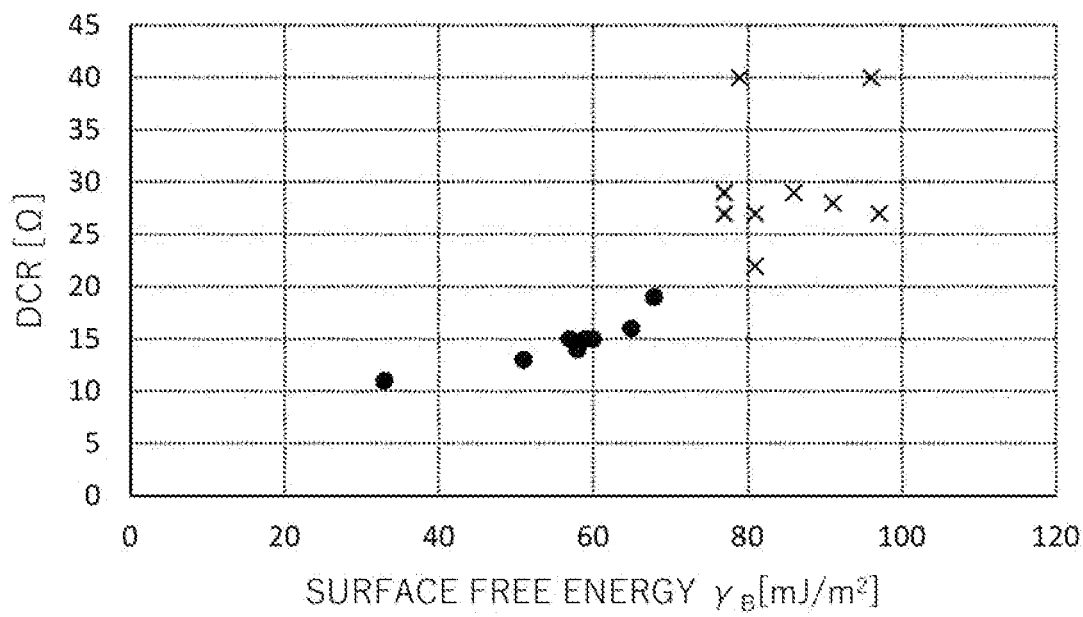
FIG. 13 is a plot of the value of the DCR of the battery with respect to the surface free energy $\gamma_B$ of the electrode binder (B) according to the examples and the comparative examples of the present invention.
Figure 14:
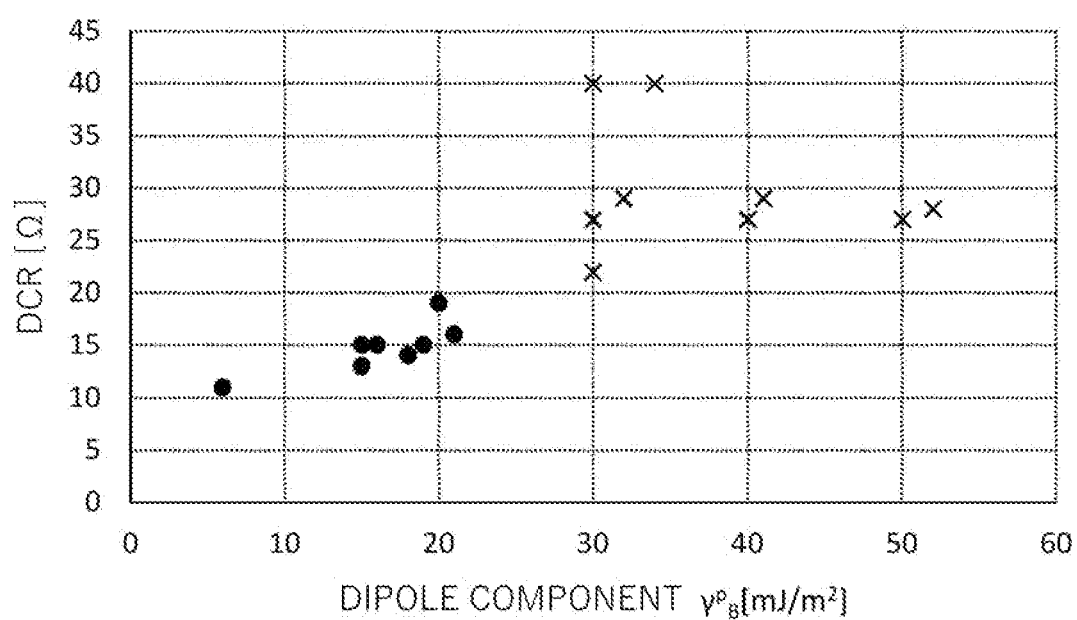
FIG. 14 is a plot of the value of the DCR of the battery with respect to the dipole component $\gamma^P_B$ of the surface free energy $\gamma_B$ of the electrode binder (B) according to the examples and the comparative examples of the present invention.
Figure 15:
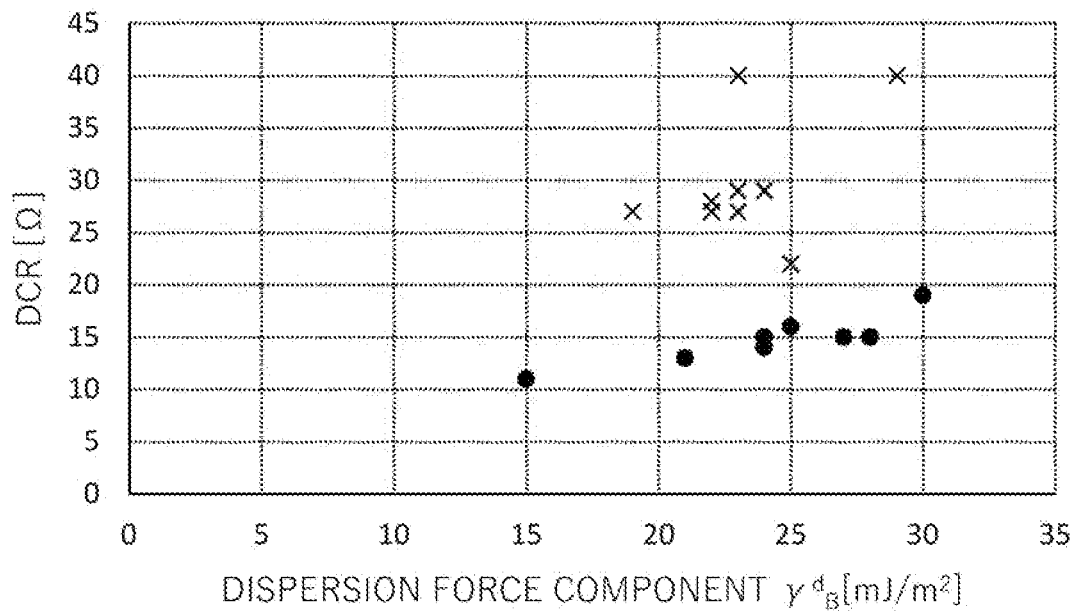
FIG. 15 is a plot of the value of the DCR of the battery with respect to the dispersion force component $\gamma^d_B$ of the surface free energy $\gamma_B$ of the electrode binder (B) according to the examples and the comparative examples of the present invention.
Figure 16:
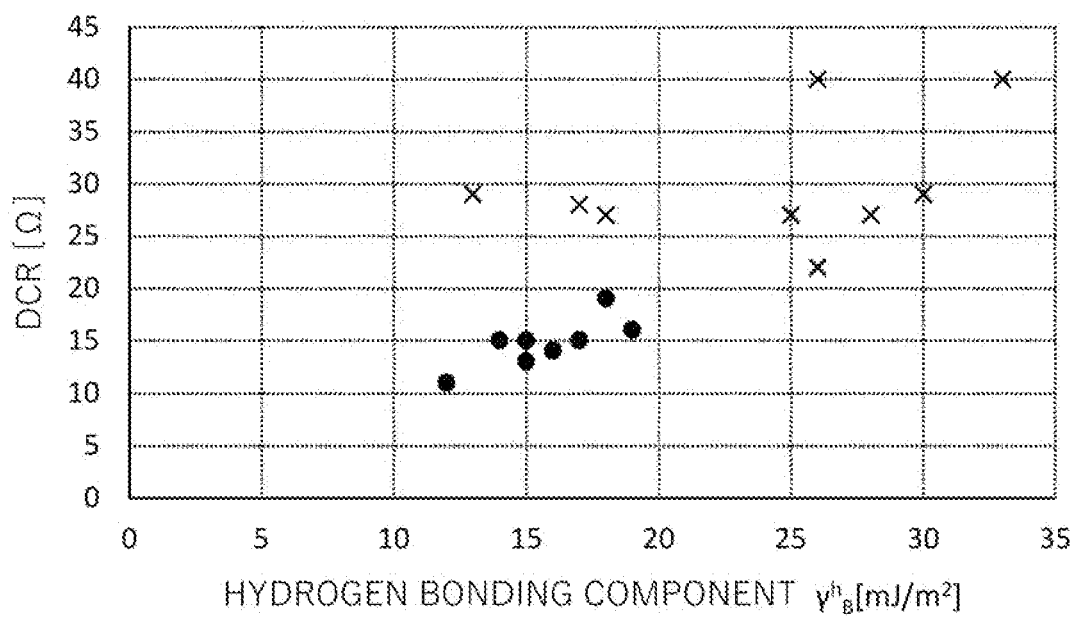
FIG. 16 is a plot of the value of the DCR of the battery with respect to the hydrogen bonding component $\gamma^h_B$ of the surface free energy $\gamma_B$ of the electrode binder (B) according to the examples and the comparative examples of the present invention.

FIGS. 13 to 16 is a plot of the values of the DCR of the battery with respect to the surface free energy $\gamma_B$ of the electrode binder (B) and its components $\gamma^d_B$, $\gamma^p_B$, $\gamma^h_B$ according to the examples and the comparative examples of the present invention. In the figures, an example is shown by • and a comparative example is shown by x.

As can be seen from FIGS. 13 to 16, when the surface free energy $\gamma_B$ of the electrode binder (B) is 70 mJ/m² or less and the dipole component $\gamma^p_B$ of the surface free energy is 26 mJ/m² or less, it is understood that a battery with a low DCR can be obtained by the electrode binder (B).

Further, as can be seen from FIGS. 13 to 16, in order to obtain a battery having a low DCR, it is necessary that the surface free energy $\gamma_B$ of the electrode binder (B) is 70 mJ/m² or less, and the dipole component $\gamma^p_B$ of the surface free energy is 26 mJ/m² or less.

[6-5 Conclusion] In summary, according to the electrode binder for a nonaqueous secondary battery (B) of the present invention, it is possible to obtain a secondary battery which has an electrode active material layer having few cracks and a high peeling strength to the current collector, and which has a low internal resistance and a good cycle characteristic.

The invention claimed is:

1. An electrode binder for a nonaqueous secondary battery, which is water-soluble and comprises a resin component and a surfactant,
    wherein a surface free energy YB at 23° C. is 70 mJ/m² or less;
    a dipole component $\gamma^P_B$ of the surface free energy is 26 mJ/m² or less;
    the surfactant is polyoxyethylene alkyl ether;
    the resin component comprises
        a polymer of a compound having an ethylenically unsaturated bond, and
        a dispersant selected from the group consisting of carboxymethyl cellulose and its metal salts;
    the polymer is a copolymer of compounds comprising
        a compound having an ethylenically unsaturated bond selected from the group consisting of (meth)acrylic acid and (meth)acrylic acid salt, and
        another vinyl compound selected from the group consisting of styrene, a divinylbenzene, a butadiene, an N-vinylacetamide, an N-vinylformamide, a vinyl alcohol, a vinyl acetate.

2. The electrode binder for a nonaqueous secondary battery according to claim 1, wherein the surface free energy $\gamma_B$ is 66 mJ/m² or less.

3. The electrode binder for a nonaqueous secondary battery according to claim 1, wherein the dipole component $\gamma^P_B$ of the surface free energy is 22 mJ/m² or less.

4. The electrode binder for a nonaqueous secondary battery according to claim 1, wherein a hydrogen bonding component $\gamma^h_B$ of the surface free energy is 24 mJ/m² or less.

5. A nonaqueous secondary battery electrode, comprising a current collector and an electrode active material layer,
    wherein the electrode active material layer comprises an electrode binder for a nonaqueous secondary battery according to claim 1, and an electrode active material; and
    the electrode active material layer is formed on the current collector.

6. The nonaqueous secondary battery electrode according to claim 5,
    wherein the electrode active material layer comprises 85% by mass or more and 99% by mass or less of the electrode active material.

7. The nonaqueous secondary battery electrode according to claim 5, wherein the electrode active material comprises a Si element-containing material and a carbon material.

8. The nonaqueous secondary battery electrode according to claim 5, wherein a peeling strength of the electrode active material layer with respect to the current collector is 30 mN/mm or more.

9. A nonaqueous secondary battery, which comprises the nonaqueous secondary battery electrode according to claim 5,
    wherein the nonaqueous secondary battery uses an alkali metal ion as a charge carrier.

10. The nonaqueous secondary battery according to claim 9, comprising an organic solvent solution of an alkali metal salt, as an electrolyte solution.

11. The nonaqueous secondary battery according to claim 10, wherein the organic solvent of the electrolyte solution comprises at least one kind selected from the group consisting of a carbonate compound, a nitrile compound and a carboxylic acid ester.

\* \* \* \* \*